United States Patent
Arnold et al.

(10) Patent No.: US 7,407,364 B2
(45) Date of Patent: Aug. 5, 2008

(54) TURBOCHARGER COMPRESSOR HAVING PORTED SECOND-STAGE SHROUD, AND ASSOCIATED METHOD

(75) Inventors: Steve Don Arnold, Ranch Palos Verdes, CA (US); Kristian N. Dullack, Carson, CA (US); David A. Calta, Newbury Park, CA (US); Glenn F. Thompson, Palos Verdes Estates, CA (US)

(73) Assignee: Honeywell International, Inc., Morristown, NJ (US)

( * ) Notice: Subject to any disclaimer, the term of this patent is extended or adjusted under 35 U.S.C. 154(b) by 665 days.

(21) Appl. No.: 11/069,336

(22) Filed: Mar. 1, 2005

(65) Prior Publication Data

US 2006/0198727 A1 Sep. 7, 2006

(51) Int. Cl.
*F01D 25/26* (2006.01)
(52) U.S. Cl. ............... 415/58.4; 415/100; 415/144; 415/211.2
(58) Field of Classification Search .......... 415/1, 415/99, 58.4, 100, 144, 204, 206, 211.2
See application file for complete search history.

(56) References Cited

U.S. PATENT DOCUMENTS

| 4,155,684 | A | * | 5/1979 | Curiel et al. ............ 417/409 |
| 5,246,335 | A | * | 9/1993 | Mitsubori et al. .......... 415/58.3 |
| 6,062,028 | A | | 5/2000 | Arnold et al. |
| 6,324,848 | B1 | | 12/2001 | Gladden et al. |
| 6,345,503 | B1 | | 2/2002 | Gladden |
| 6,672,062 | B2 | | 1/2004 | Shaffer |
| 6,792,755 | B2 | | 9/2004 | Arnold et al. |
| 6,834,501 | B1 | | 12/2004 | Vrbas et al. |
| 7,229,243 | B2 | * | 6/2007 | Nikpour et al. ............ 415/57.1 |

FOREIGN PATENT DOCUMENTS

| EP | 0 526 965 | 2/1993 |
| FR | 95 517 | 12/1970 |
| GB | 2202585 A | 9/1988 |
| WO | WO 2006/060732 | 6/2006 |

OTHER PUBLICATIONS

The International Search Report for PCT/US2006/006867; Filed Feb. 27, 2006; Date of Completion Jul. 14, 2006; Date of Mailing Jul. 25, 2006.

* cited by examiner

*Primary Examiner*—Edward Look
*Assistant Examiner*—Devin Hanan
(74) *Attorney, Agent, or Firm*—Alston & Bird, LLP

(57) ABSTRACT

A two-stage radial compressor having a ported second-stage shroud, forming a passive surge control system. Thus, some proportion of the fluid is allowed to flow between the second-stage of the compressor in the vicinity of the impeller blade tips, through a port in the shroud into an upstream portion of the compressor flow path that leads into the second-stage impeller inlet. The fluid is allowed to flow in either direction, depending on the pressure difference existing between the two locations. Surge margin at higher pressure ratios is significantly increased by the ported second-stage shroud.

11 Claims, 11 Drawing Sheets

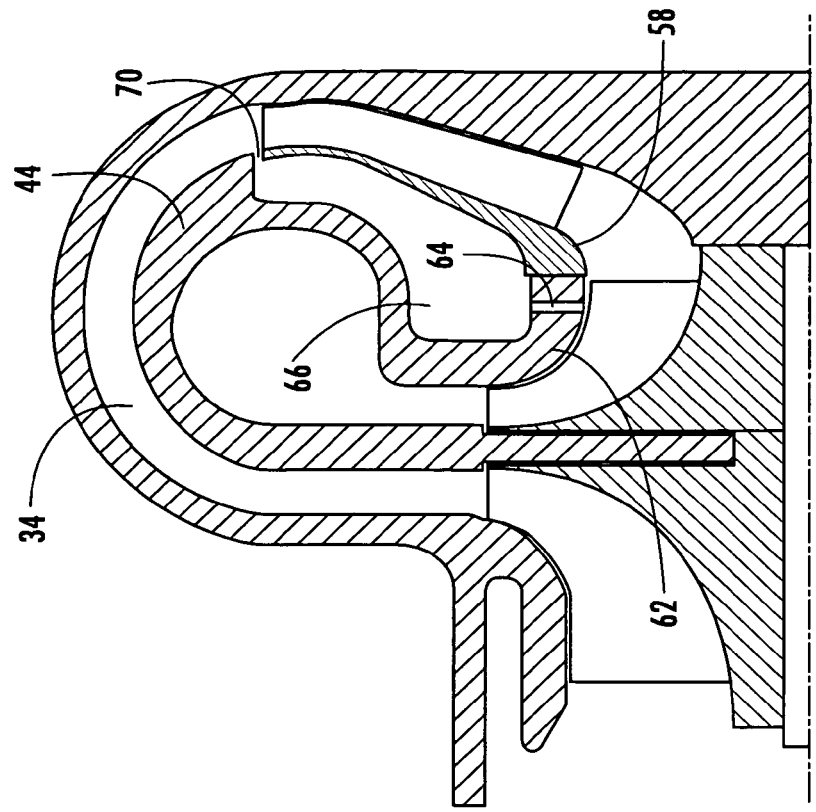
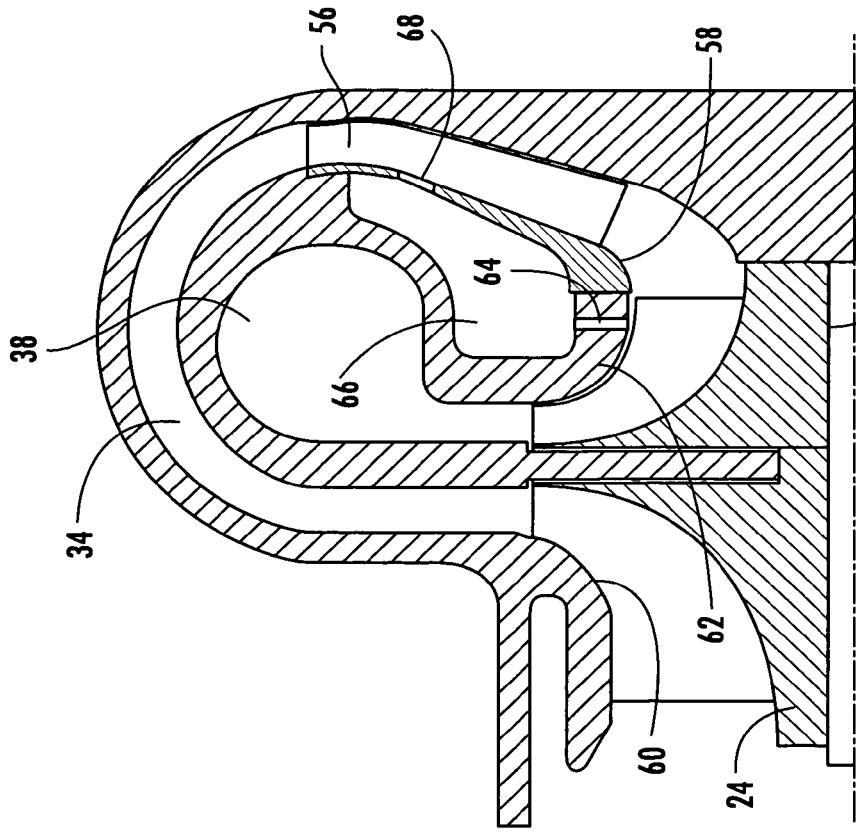

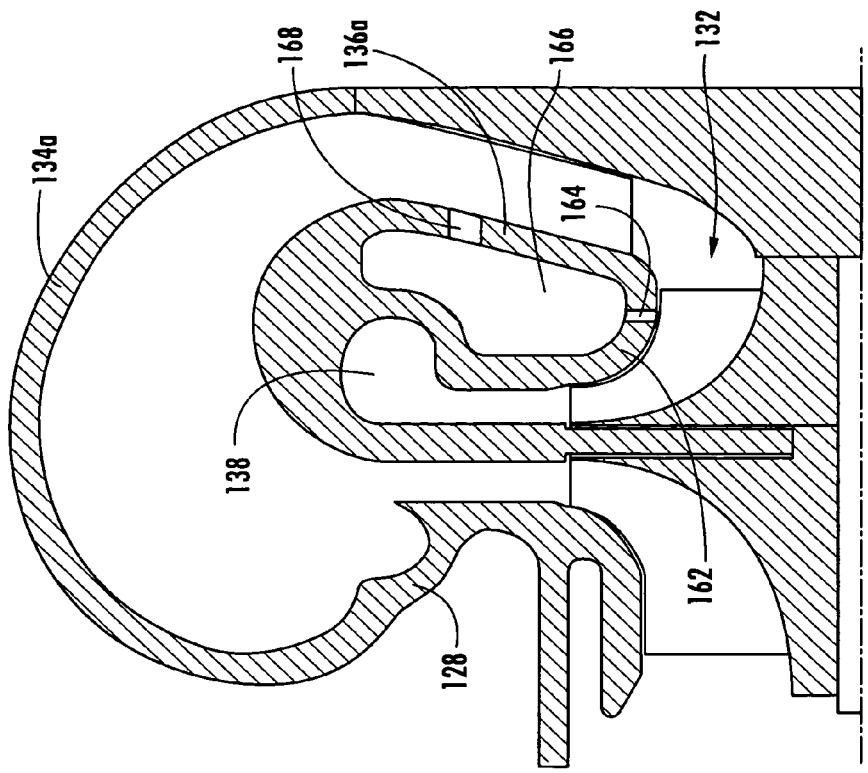
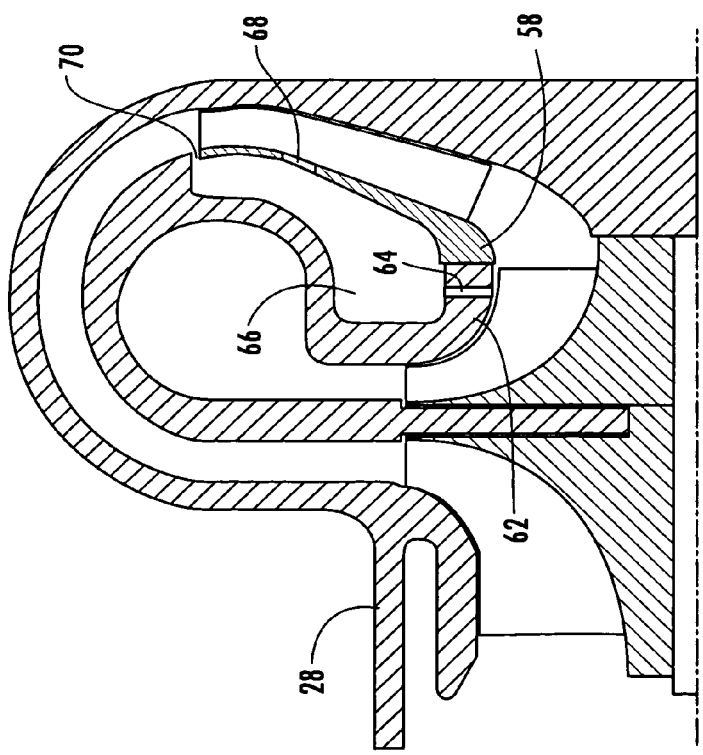

TURBOCHARGER COMPRESSOR HAVING PORTED SECOND-STAGE SHROUD, AND ASSOCIATED METHOD

CROSS-REFERENCE TO RELATED APPLICATION

This application is related to U.S. patent application Ser. No. 11/004,467, filed on Dec. 3, 2004, currently pending.

BACKGROUND OF THE INVENTION

The present invention relates to two-stage radial compressors and to turbochargers that include such compressors.

Radial compressors are used in various types of turbomachinery, including turbochargers for internal combustion engine systems. A radial compressor generally includes at least one compressor stage formed by a rotating impeller mounted on a shaft within a compressor housing. The housing defines an inlet flow path that typically leads into the impeller in a generally axial direction. The impeller includes a hub and a plurality of blades spaced about its circumference and extending out from the hub. The impeller is configured to receive fluid in the axial direction and to compress the fluid and discharge the fluid in a generally radially outward direction into a volute defined by the compressor housing. The housing includes a wall or shroud that extends proximate the tips of the impeller blades and, together with the hub of the impeller, defines the main flow path through the impeller.

In some applications requiring pressure ratios above that achievable by a single-stage radial compressor, two-stage radial compressors are employed. A second stage is formed by a second-stage impeller, which receives the fluid from the first-stage impeller and further compresses it to a higher pressure. Examples of two-stage radial compressors are described in U.S. Pat. Nos. 6,062,028 and 6,834,501, the disclosures of which are incorporated herein by reference.

In any compressor, there is a limit to the pressure ratio that can be attained at a given flow rate before surge occurs; the locus of points at which surge occurs, as a function of flow, is referred to as the surge line on the compressor map. There is also a limit to how much flow can be passed through the compressor before choking occurs somewhere in the compressor. The useful operation range of the compressor is defined between the surge line and the flow rate at choke. It is desirable to have a wide range of operation. In particular, on a compressor map of pressure ratio versus flow rate, it is desirable to push the surge line as far toward the upper left-hand corner of the map as possible. Many different approaches for controlling surge in compressors have been proposed over the years. Some approaches involve relatively complicated active control systems using feedback control techniques and/or variable-geometry mechanisms in the compressor. For many applications, such as turbochargers, such complex approaches are not practical.

BRIEF SUMMARY OF THE INVENTION

The present invention addresses the above needs and achieves other advantages by providing a two-stage radial compressor having a simple passive surge control system. It has been discovered that surge in a two-stage radial compressor can be delayed to lower flows and higher pressure ratios by allowing some proportion of the fluid to flow between the second-stage of the compressor in the vicinity of the impeller blade tips and an upstream portion of the compressor flow path that leads into the second-stage impeller inlet. The fluid is allowed to flow in either direction, depending on the pressure difference existing between the two locations. Thus, at some operating conditions at which the pressure at the impeller blade tips is higher than that at the upstream flow path location, the fluid will flow in a recirculating fashion from the blade tip region to the upstream location. At other operating conditions, the pressure gradient may be opposite and the fluid may flow in the opposite direction.

The second-stage of the compressor includes a second-stage shroud that forms the radially outer wall of the compressor flow path through the second stage and extends proximate the tips of the blades. The shroud includes at least one port through which fluid can pass. A flow passage is defined by the compressor housing, leading from the port back into the flow path upstream of the second-stage impeller inlet. The compressor housing can have various geometries for conducting the fluid from the first-stage impeller into the second-stage impeller, and the particular configuration for providing fluid communication between the upstream flow path and the flow passage connected to the shroud port(s) depends on the compressor housing geometry.

In one embodiment of the invention, the compressor includes a vane assembly in the inlet flow path of the second-stage impeller, the vane assembly comprising a wall and a plurality of circumferentially spaced vanes affixed to the wall. The wall of the vane assembly defines at least one opening connected with the flow passage that leads from the second-stage shroud port(s) into the inlet flow path such that the inlet flow path is in fluid communication with the flow passage via such opening(s). Advantageously, the wall of the vane assembly defines a plurality of such openings spaced circumferentially apart.

In another embodiment of the invention, the wall of the vane assembly is connected to the compressor housing such that a gap exists between an edge of the wall and the compressor housing, the gap being connected with the flow passage that leads from the second-stage shroud port(s) into the inlet flow path.

In still another embodiment of the invention, the compressor housing defines a first-stage volute that receives fluid from the first-stage impeller, the first-stage and second-stage volutes each extending circumferentially at least partially about the first-stage and second-stage impellers, respectively. The compressor includes an interstage duct for conducting fluid from the first-stage volute to the second-stage inlet flow path. The interstage duct comprises first and second conduits connected at circumferentially spaced positions to the first-stage volute, the first and second conduits passing radially outward of the second-stage volute and then extending radially inwardly and connecting at circumferentially spaced positions to the inlet flow path of the second-stage impeller. The opening(s) into the inlet flow path of the second stage are formed in the walls of the first and second conduits, or as gaps between such walls and other portions of the compressor housing.

In addition to the ported second-stage shroud, a compressor in accordance with some embodiments of the invention can also include a ported first-stage shroud.

The invention also encompasses turbochargers having a two-stage radial compressor as described herein, as well as a method for enhancing performance of a two-stage radial compressor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is a schematic cross-sectional view of a two-stage compressor in accordance with a first embodiment of the invention;

FIG. 6 is a schematic cross-sectional view of a two-stage compressor in accordance with a second embodiment of the invention;

FIG. 7 is a schematic cross-sectional view of a two-stage compressor in accordance with a third embodiment of the invention;

FIG. 8 is a schematic cross-sectional view of a two-stage compressor in accordance with a fourth embodiment of the invention;

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
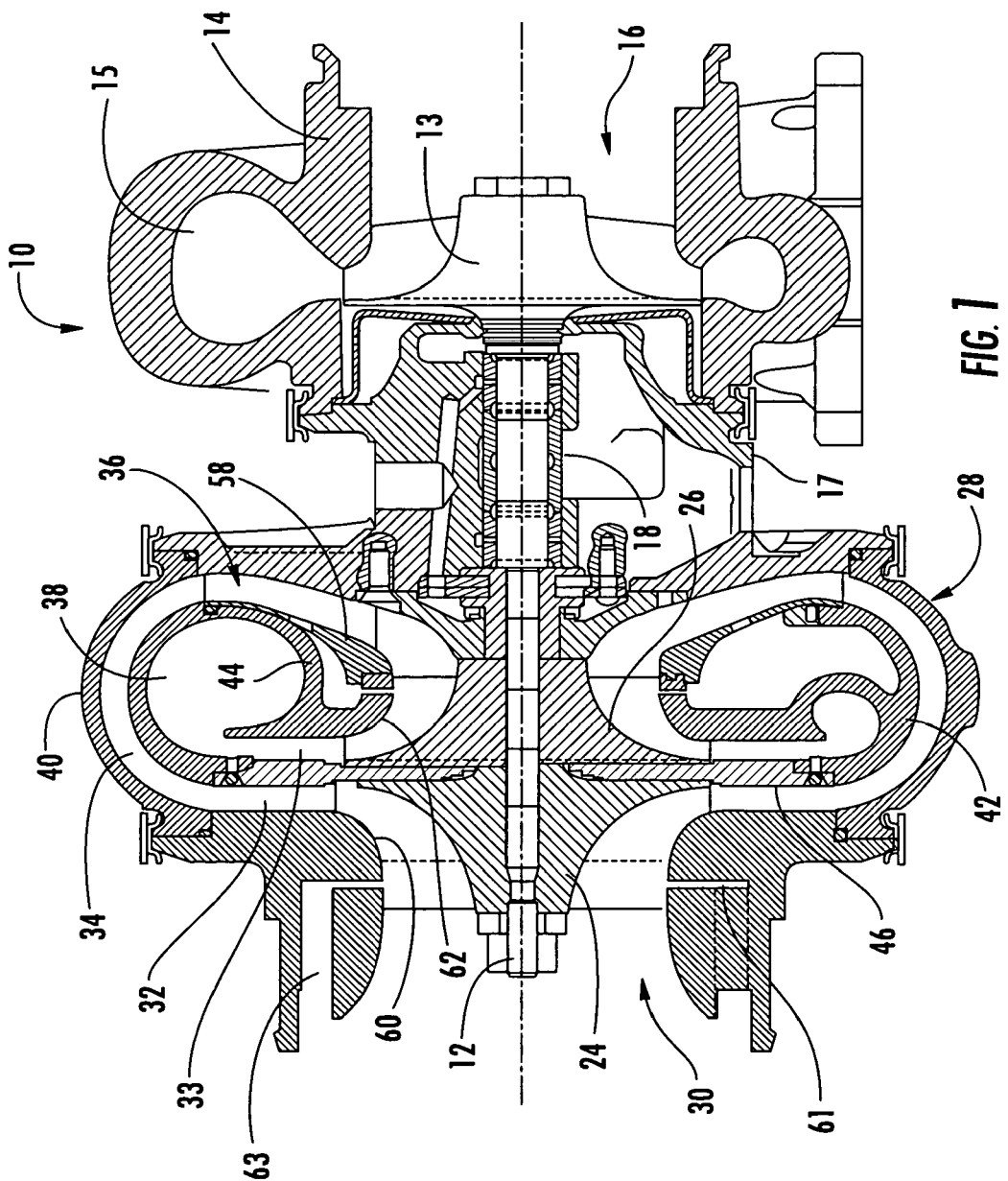
FIG. 1 is a cross-sectional view of a turbocharger in accordance with one embodiment of the present invention.

FIG. 1 shows a turbocharger 10 having a two-stage compressor in accordance with one embodiment of the invention. The turbocharger 10 has a configuration generally as described in U.S. Pat. No. 6,834,501, the disclosure of which is incorporated herein by reference. The turbocharger 10 includes a rotary shaft 12 on one end of which a turbine wheel 13 is mounted. The turbine section of the turbocharger 10 includes a turbine housing 14 that defines a turbine volute 15 arranged to direct fluid to the turbine wheel. The turbine housing also defines an outlet 16. Exhaust gases from an engine (not shown) are fed into the turbine volute 15. The gases then pass through the turbine and are expanded so that the turbine wheel 13 is rotatably driven, thus rotatably driving the shaft 12. The expanded gases are discharged through the outlet 16. The turbine can be a radial turbine in which the flow enters the turbine in a generally radially inward direction; however, the invention is not limited to any particular turbine arrangement. Furthermore, the turbocharger could include means other than a turbine for driving the shaft 12, such as an electric motor.

The shaft 12 passes through a center housing 17 of the turbocharger. The center housing connects the turbine housing 14 with a compressor housing assembly 28 of the turbocharger as further described below. The center housing contains bearings 18 for the shaft 12. A rear end of the compressor housing assembly 28 is affixed to the center housing 17 in suitable fashion, such as with threaded fasteners or the like.

Mounted on an opposite end of the shaft 12 from the turbine is a two-stage compressor wheel comprising a first-stage impeller 24 and a second-stage impeller 26. Surrounding the compressor wheel is the compressor housing assembly 28. A forward portion of the compressor housing assembly defines a compressor inlet 30 leading into the first-stage impeller 24. As further described below, a rear portion of the compressor housing assembly defines a series of flow paths for leading the pressurized fluid that exits the first-stage impeller into the second-stage impeller and for receiving and discharging the pressurized fluid that exits the second-stage impeller.

More particularly, the rear portion of the compressor housing assembly defines: a first-stage diffuser 32 that receives the fluid discharged from the first-stage impeller and diffuses (i.e., reduces the velocity and hence increases the static pressure of) the fluid; an interstage duct 34 that receives the fluid from the first-stage diffuser 32; an arrangement 36 of deswirl vanes that receive the fluid from the interstage duct and reduce the tangential or "swirl" component of velocity of the fluid, as well as lead the fluid into the second-stage impeller 26; a second-stage diffuser 33 that receives the fluid discharged from the second-stage impeller and diffuses the fluid; and a second-stage volute 38 that receives the fluid from the second-stage diffuser and surrounds the second-stage impeller. Although not visible in FIG. 1, and as further described below, the compressor housing assembly also defines a discharge duct that connects with the second-stage volute 38 and routes the fluid from the volute out of the compressor for feeding to the engine intake manifold or to a charge air cooler before being fed to the engine intake manifold.

The first-stage impeller 24 and second-stage impeller 26 are mounted back-to-back; that is, the downstream side of the first-stage impeller 24 is nearer the turbine than is the upstream side of the impeller, while the downstream side of the second-stage impeller 26 is farther from the turbine than is the upstream side of the impeller. The second-stage volute 38 is located generally concentrically within the interstage duct 34. More specifically, the interstage duct 34 is a generally annular structure formed by an outer wall 40 that extends substantially 360 degrees about a central axis of the interstage duct (which axis generally coincides with the axis of the shaft 12, although it does not have to so coincide), and an inner wall 42 that extends substantially 360 degrees about the duct axis and is spaced radially inwardly from the outer wall 40. The interstage duct 34 defined between the inner and outer walls is generally U-shaped in cross-section such that fluid entering the duct is flowing generally radially outwardly (i.e., with little or no axial component, although it does have a substantial swirl component); the duct then turns the fluid so that it is flowing generally axially (again, with substantial swirl component, but with little or no radial component), and finally turns the fluid to a generally radially inward direction (with little or no axial component, but with substantial swirl component) as the fluid enters the deswirl vane arrangement 36.

The second-stage volute 38 is located generally concentric with and radially inward of the inner wall 42 of the interstage duct. The volute 38 is delimited at its radially outward side by the inner wall 42, and at its radially inward side by an extension 44 of the wall 42.

The first-stage diffuser 32 is defined between the forward portion of the compressor housing assembly 28 and a stationary seal plate 46. The seal plate separates the diffuser 32 from the second-stage volute 38 and also forms the forward wall of the second-stage diffuser 33. The seal plate engages the compressor wheel with a suitable rotating sealing surface to prevent higher-pressure air discharged from the second-stage impeller from leaking into the lower-pressure first-stage diffuser 32. Other types of seal arrangements can be used instead of the arrangement illustrated in FIG. 1.

Figure 2:
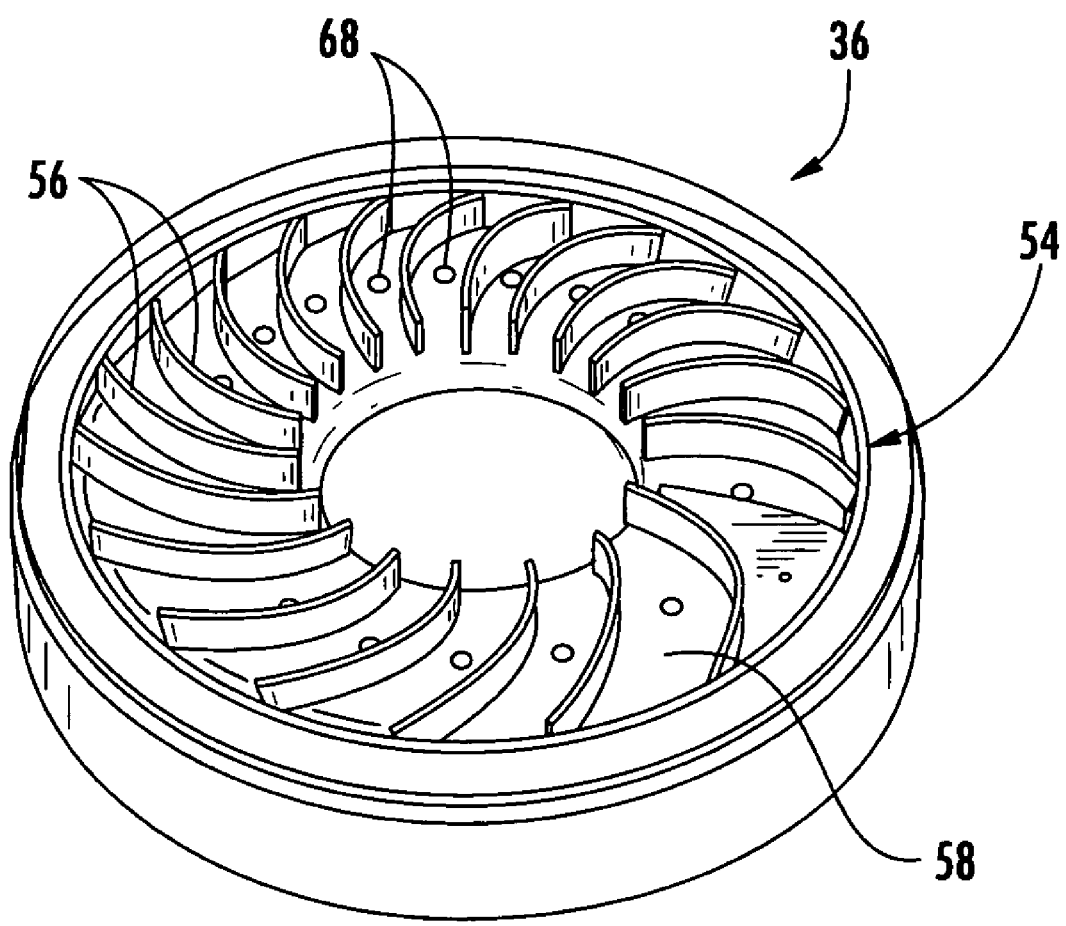
FIG. 2 is a perspective view of the vane assembly of the turbocharger of FIG. 1.

The deswirl vane arrangement 36 includes a ring 54 of generally annular form. With reference to FIG. 2, the vane ring 54 comprises a plurality of deswirl vanes 56 that are spaced apart about a circumference of the ring. The vanes 56 are oriented generally radially with respect to the axis of the compressor. The vanes are cambered and arranged in such a way that the leading edges of the vanes (at the outer diameter of the ring) are directed generally in the same direction as the swirling flow entering the vanes from the interstage duct, while the trailing edges (at the inner diameter of the ring) are directed substantially in the direction in which it is desired for the flow to exit the vanes, i.e., with little or no swirl component of velocity. The vanes thus reduce the swirl component of velocity before the flow enters the second-stage impeller.

The vanes 56 are affixed to (and can be integrally formed with) a wall 58 of generally annular form that extends generally radially with respect to the compressor axis. The axial extent of each vane 56 is oriented generally perpendicular to the wall 58. As shown in FIG. 1, a radially inner end of the wall 58 engages the inward extension 44 of the wall of the second-stage volute 38 and an O-ring or the like (not shown) is arranged therebetween for sealing this connection.

The compressor housing includes a first-stage shroud 60 that extends circumferentially about the first-stage impeller 24 closely adjacent to the tips of the blades of the impeller; the main flow path through the first-stage impeller is defined between the first-stage shroud and the hub of the impeller. The housing also includes a second-stage shroud 62, formed by the aforementioned inward extension 44 of the housing wall 42, that extends circumferentially about the second-stage impeller 26 closely adjacent to the tips of the blades of the impeller; the main flow path through the second-stage impeller is defined between the second-stage shroud and the impeller hub.

The upstream portion of each impeller that the fluid first encounters is often referred to as the inducer of the impeller. When the flow rate through the compressor is reduced while maintaining pressure ratio at a relatively high level, at some point the surge line of the compressor map is encountered. Surging at relatively high pressure ratios typically occurs because of stalling of the inducer of one or both impellers, wherein the flow at the blade tips of the inducer begins locally to recirculate, thereby reducing the effective flow area of the inducer. In contrast, below a certain pressure ratio, surging typically is the result of stalling of one or both diffusers. The surge line of many compressors has a kink or "knee" above which surging is caused by inducer stall, and below which surging is caused by diffuser stall.

The present invention particularly addresses surging above the knee caused by inducer stall. In accordance with the invention, a ported second-stage shroud 62 is employed in order to delay the onset of inducer stall of the second-stage impeller to higher pressure ratios at flow (or, stated differently, to lower flows at pressure ratio). Thus, with particular reference to FIG. 5, the second-stage shroud 62 includes at least one port 64 that extends through the shroud into a flow passage 66 defined in the compressor housing. Advantageously, the shroud includes a plurality of ports 64 spaced circumferentially about the shroud, and the flow passage 66 is a generally annular cavity defined in the compressor housing surrounding the second-stage impeller 26. In the embodiment of FIG. 5, the flow passage 66 is defined by a recess or cavity in the wall of the housing that forms the second-stage volute 38; that recess is closed by the wall 58 of the vane arrangement 36. The wall 58 at its radially inner end engages the second-stage shroud 62 and an O-ring or other seal (not shown) is disposed therebetween for sealing the interface.

The wall 58 includes at least one opening 68, and preferably includes a plurality of circumferentially spaced openings 68 as shown in FIG. 2, that connect the flow passage 66 with the inlet flow path through the vane arrangement 36. The openings 68 can be located between adjacent vanes 56 as shown. As a result, fluid can pass from the inducer region of the second-stage impeller through the ports 64 in the second-stage shroud 62 into the flow passage 66, and through the openings 68 back into the inlet flow path of the second-stage impeller. Fluid can also pass in the reverse direction from the inlet flow path through the openings 68 into the flow passage 66 and through the ports 64 into the inducer of the second-stage impeller. The direction of flow depends on the sense of the pressure gradient between the inducer location and the upstream inlet flow path location.

At higher pressure ratios, where inducer stall of the second-stage impeller 26 would ordinarily begin to occur, it has been found that the ported second-stage shroud (in comparison with an otherwise identical non-ported shroud) delays the onset of surge. It is believed that at near-surge conditions the ported shroud allows fluid to pass into the flow passage 66 and through the openings 68 back into the inlet flow path, and thereby prevents or reduces the local flow recirculation in the inducer tip region that normally attends inducer stall and surge.

As shown in FIG. 1, a two-stage compressor in accordance with the invention can also include a ported first-stage shroud 60. Thus, the first-stage shroud can include one or more ports 61 that connect with a flow passage 63 that leads back to the compressor inlet 30. Alternatively, the compressor can have a non-ported first-stage shroud.

Figure 3:
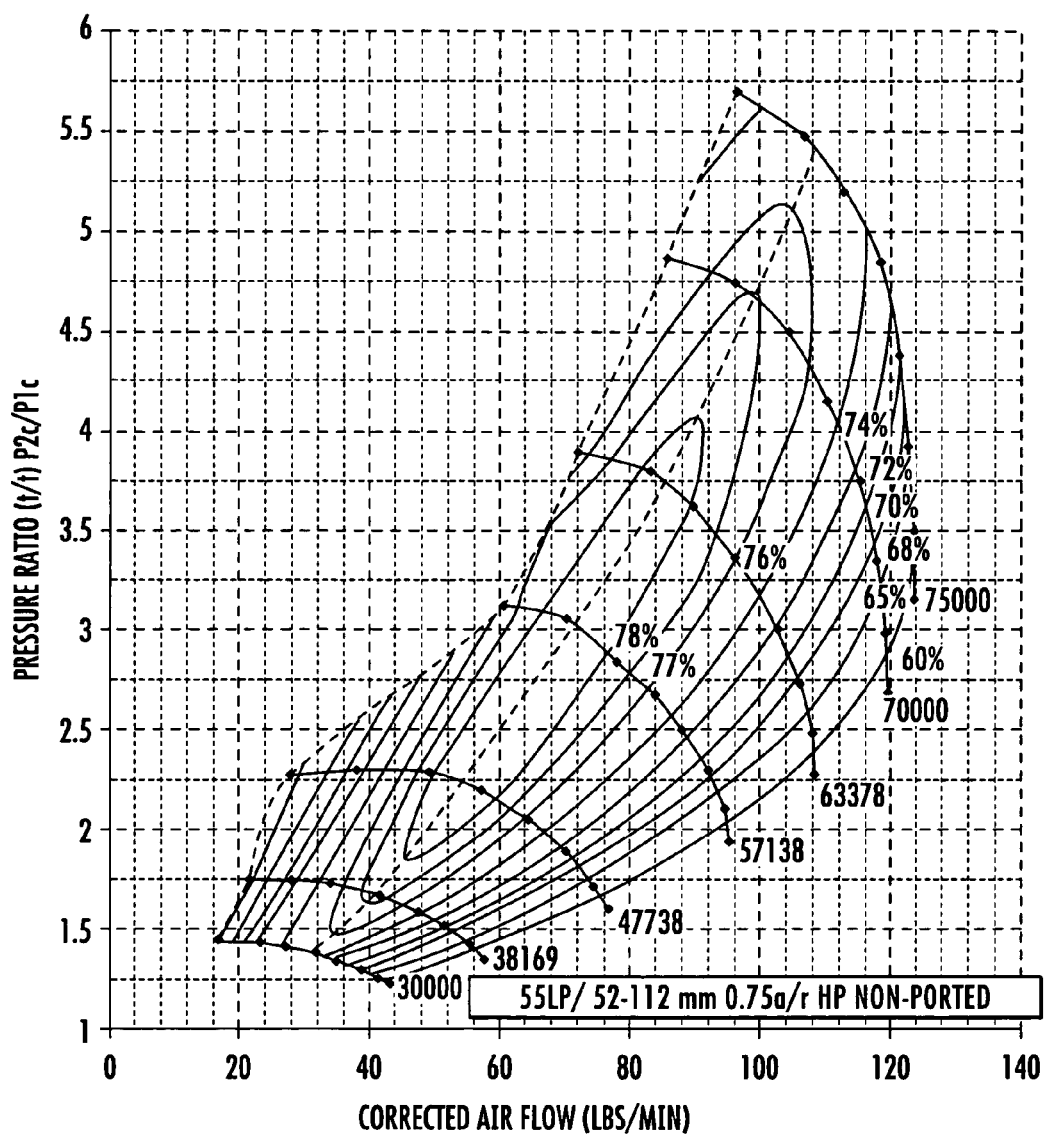
FIG. 3 is a compressor map obtained from testing of a two-stage radial compressor having non-ported shrouds in accordance with the prior art.
Figure 4:
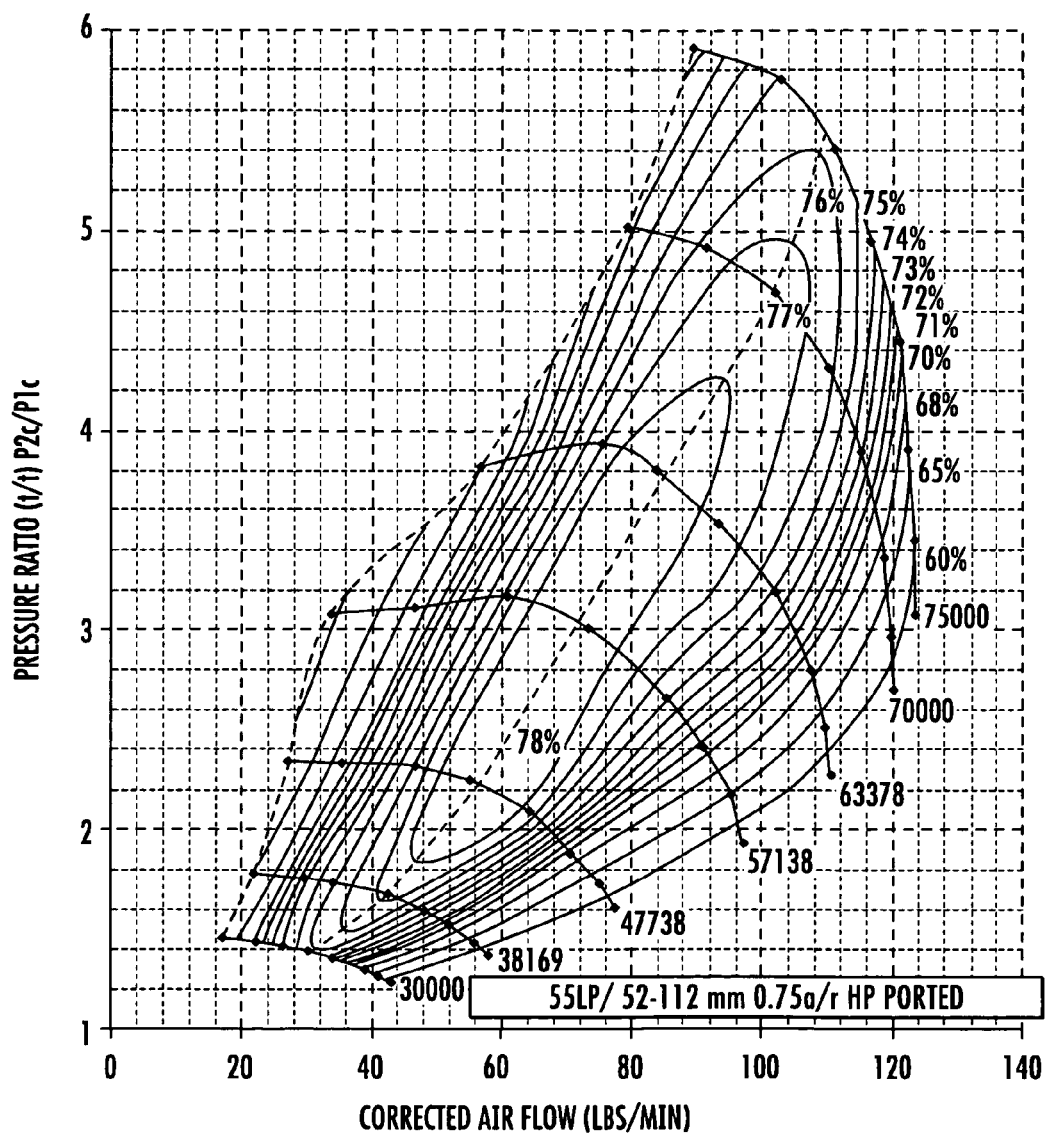
FIG. 4 is a compressor map obtained from testing of a two-stage radial compressor differing from the compressor of FIG. 3 only in that the second-stage shroud is ported.

To determine the effectiveness of the second-stage ported shroud 62, a series of tests were conducted. FIG. 3 is a compressor map obtained from testing of a two-stage radial compressor configured generally as depicted in FIG. 1, but having non-ported first-stage and second-stage shrouds. For comparison, FIG. 4 shows a compressor map obtained from testing of a compressor configured generally as in FIG. 1, having the ported second-stage shroud 62 and non-ported first-stage shroud. With reference to FIG. 3, it can be seen that the prior-art compressor with non-ported shrouds has a kink or knee in the surge line at a pressure ratio of about 2.3 and a corrected flow of about 28 lb/min. Below the knee, it is believed the surge line is limited by diffuser stall. Above the knee, it is believed that surge is limited by inducer stall, and particularly inducer stall of the second-stage impeller. This appears to be borne out by the test results. Below the knee, the surge line of the compressor with ported second-stage shroud (FIG. 4) is substantially the same as that of the compressor with non-ported shroud (FIG. 3). Above the knee, however, the surge line of the compressor with ported second-stage shroud is substantially higher than that of the compressor with non-ported shroud. The compressor map with ported second-stage shroud has a substantially wider range of operation as measured by the ratio of the flow at choking to the flow at surge. For instance, at a pressure ratio of 3.5, for the compressor with non-ported shroud, the flow at choking is approximately 124 lb/min and the flow at surge is about 68 lb/min, yielding a choke/surge flow ratio of about 1.8. In contrast, at the same pressure ratio of 3.5, the compressor with ported second-stage shroud has a flow at choking of about 124 lb/min and a flow at surge of about 47 lb/min, yielding a choke/surge flow ratio of about 2.6, which is about 45 percent greater than that with the non-ported shroud.

At a flow rate of 80 lb/min, the compressor with non-ported shroud has a maximum pressure ratio at surge of about 4.45, while the compressor with ported second-stage shroud has a maximum pressure ratio of about 5.06, which is an increase of about 13.7 percent. The benefits of the ported second-stage shroud thus are quite significant.

FIG. 6 shows an alternative embodiment generally similar to that of FIG. 5. In this embodiment, the flow passage 66 is in fluid communication with the inlet flow path into the second-stage impeller 26 via a gap 70 defined between the radially outer edge of the vane ring wall 58 and the inner wall 44 of the interstage duct 34. The gap 70 can comprise a plurality of gaps spaced about the circumference of the vane ring wall 58; at locations between the gaps, the radially outer edge of the vane ring wall 58 engages the wall 44.

FIG. 7 illustrates yet another embodiment that essentially combines the openings 68 of the FIG. 5 embodiment with the gaps 70 of the FIG. 6 embodiment.

Figure 9:
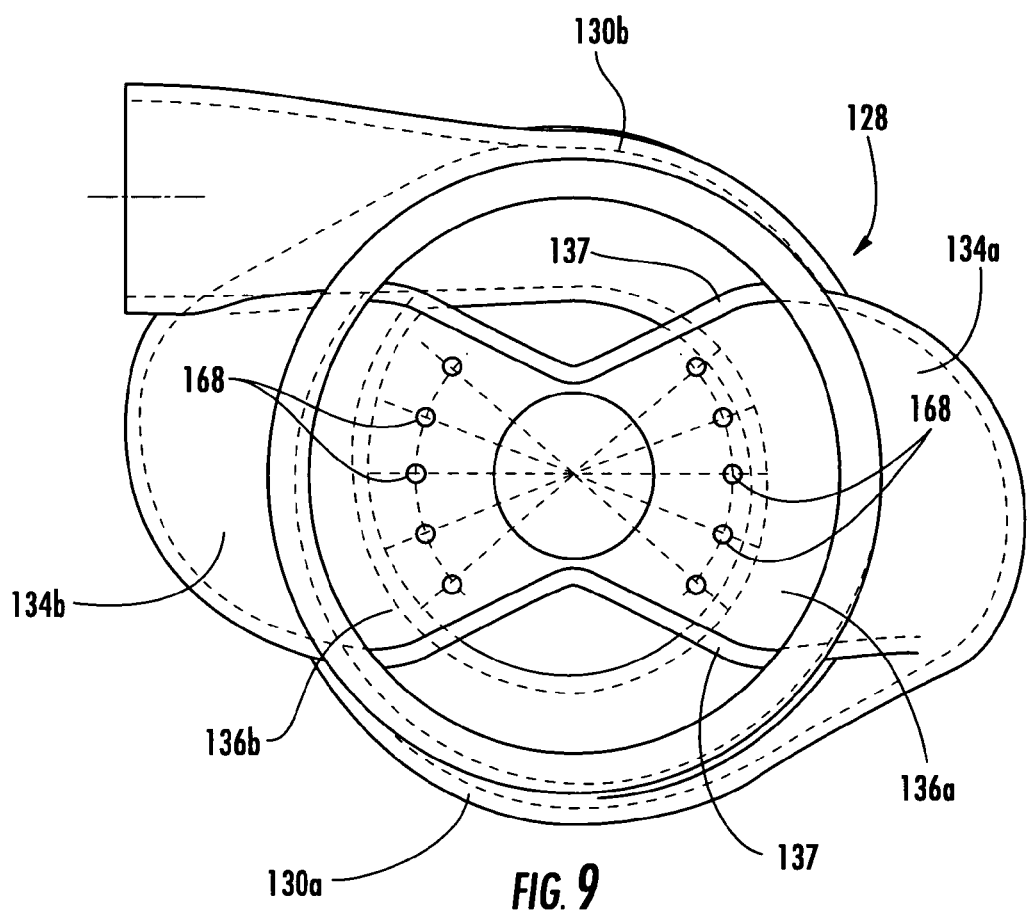
FIG. 9 is a view into the compressor housing of FIG. 8, as viewed toward the left in FIG. 8.

FIGS. 8 and 9 illustrate still another embodiment of the invention in which the compressor housing has a different type of configuration from that of the previously disclosed embodiments. The compressor housing of FIGS. 8 and 9 is generally similar to that described in co-pending U.S. patent application Ser. No. 11/004,467, filed on Dec. 3, 2004. The compressor housing 128 of this embodiment includes a first-stage volute 130 that comprises first and second segments or portions 130a, 130b. Each portion 130a, 130b extends about 180 degrees around the compressor wheel and is fluidly connected to the second-stage inlet 132 by a respective one of first and second passages or conduits 134a, 134b. Each conduit 134a, 134b extends axially between the respective first-stage volute 130a, 130b and the second-stage inlet 132 and passes radially outward of the second-stage volute 138. Each conduit 134a, 134b includes a wall 136a, 136b that extends generally radially inwardly and faces generally axially away from the second-stage volute 138, and is roughly analogous to the vane ring wall 58 of the prior embodiments, except that each wall 136a, 136b extends for only a part of the circumference and is bounded on its opposite edges by walls 137 (FIG. 9) that extend generally radially inwardly and face each other generally in the circumferential direction. If desired, deswirl vanes (not shown) can be employed upstream of the second-stage impeller.

In this embodiment, the second stage of the compressor includes a ported second-stage shroud 162 having one or more ports 164 leading into a flow passage 166 generally as in the prior embodiments. Each of the walls 136a, 136b of the conduits 134a, 134b joins with the second-stage shroud 162. The flow passage 166 is in fluid communication with the second-stage inlet flow path 132 via a number of apertures 168 in the walls 136a, 136b. For example, as shown, each wall 136a, 136b can include a plurality of circumferentially spaced apertures 168.

Figure 10:
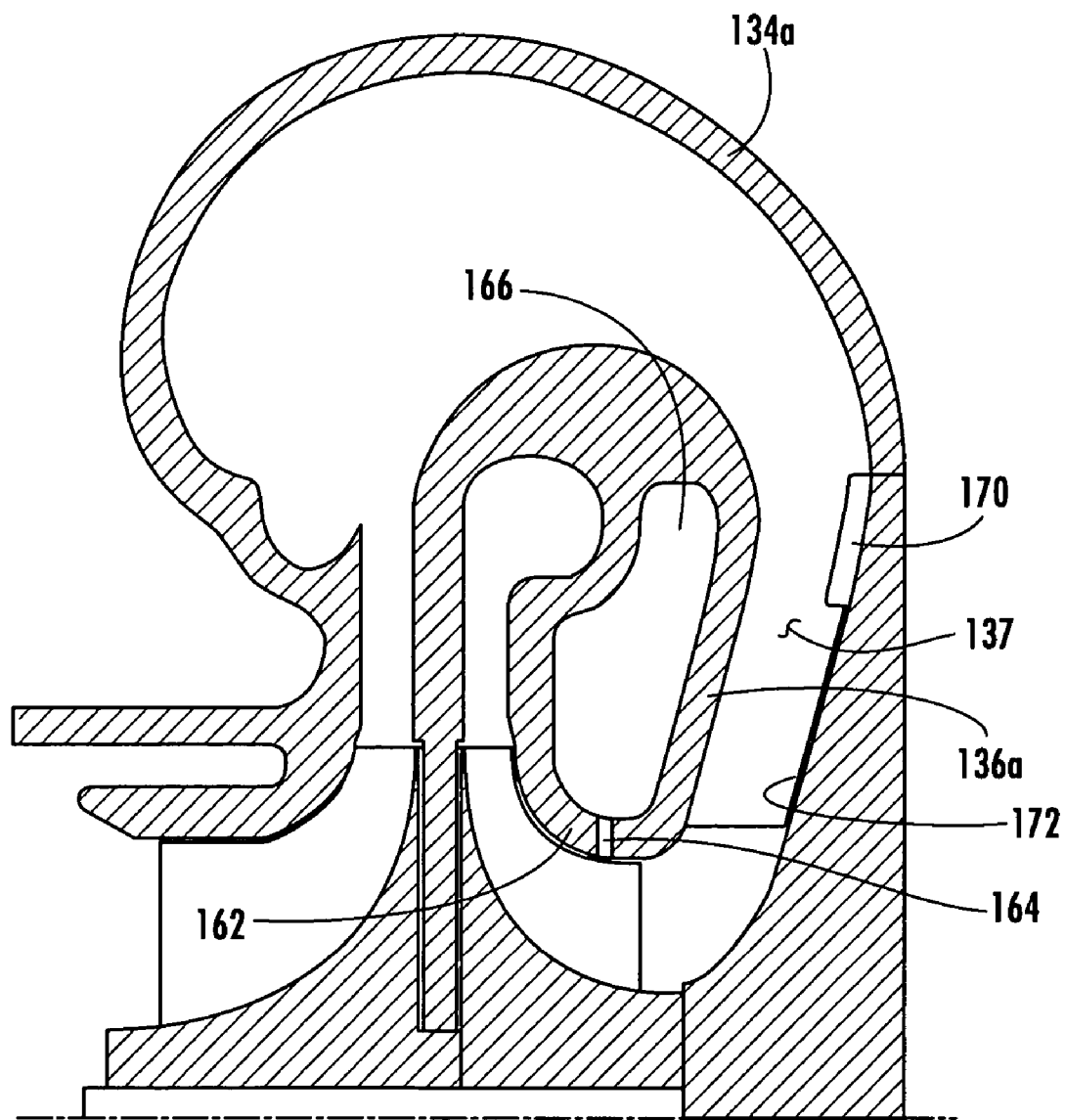
FIG. 10 is a schematic cross-sectional view of a two-stage compressor in accordance with a fifth embodiment of the invention.
Figure 11:
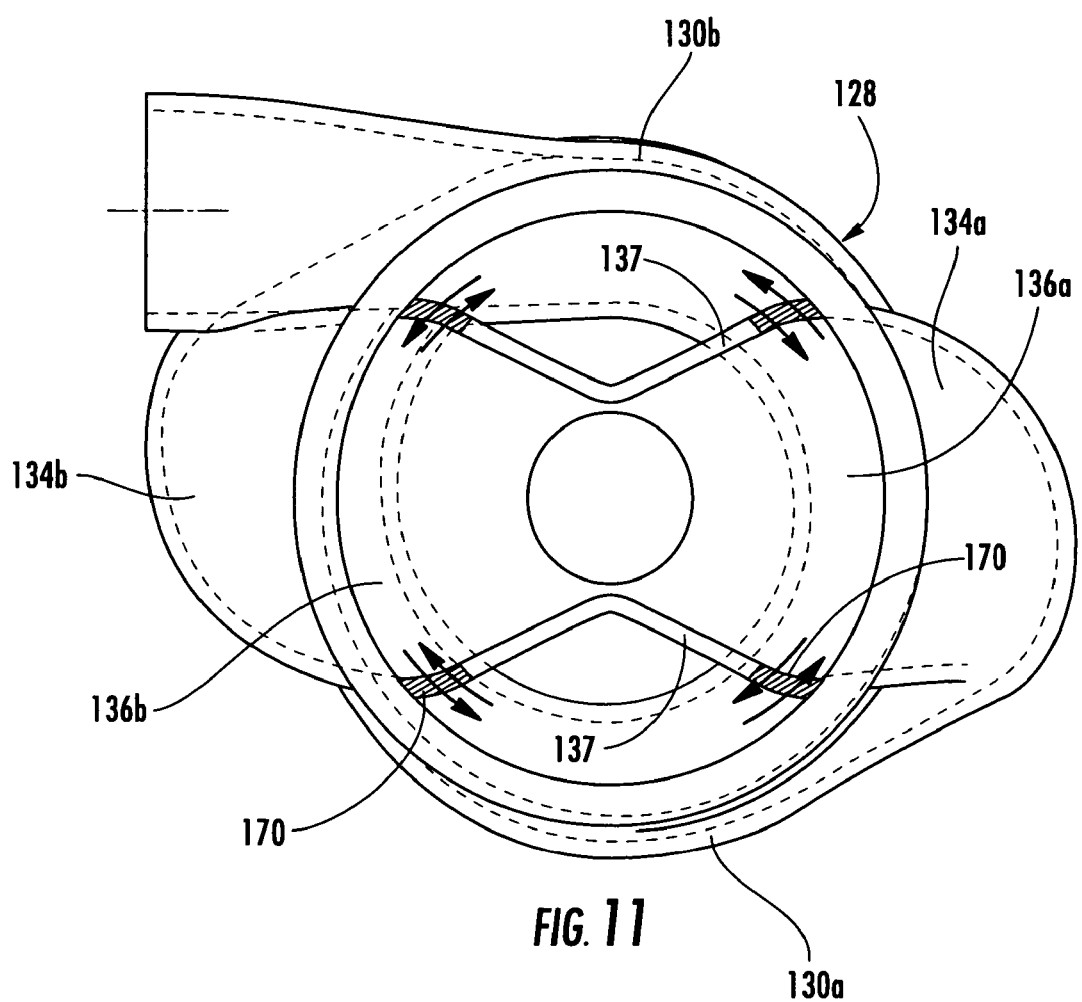
FIG. 11 is a view into the compressor housing of FIG. 10, as viewed toward the left in FIG. 10.

FIGS. 10 and 11 illustrate yet another embodiment of the invention. This embodiment is generally similar to that of FIGS. 8 and 9, except that the walls 136a, 136b of the conduits 134a, 134b do not include apertures. Instead, the walls 137 that bound the opposite circumferential edges of the walls 136a, 136b include cutouts 170 at the edges of the walls 137 that abut an opposite wall 172 of the compressor housing. The wall 172, the walls 137, and the wall 136a, 136b of each passage collectively form a pair of substantially closed flow paths that lead the fluid into the second-stage inlet from diametrically opposite radially inward directions. The cutouts 170 allow fluid to move from the flow passage 166 into these inlet flow paths and hence back to the second-stage impeller inlet. Fluid can also move in the opposite direction from the inlet flow paths into the flow passage 166 and then through the ports 164 to the inducer of the second-stage impeller.

Figure 12:
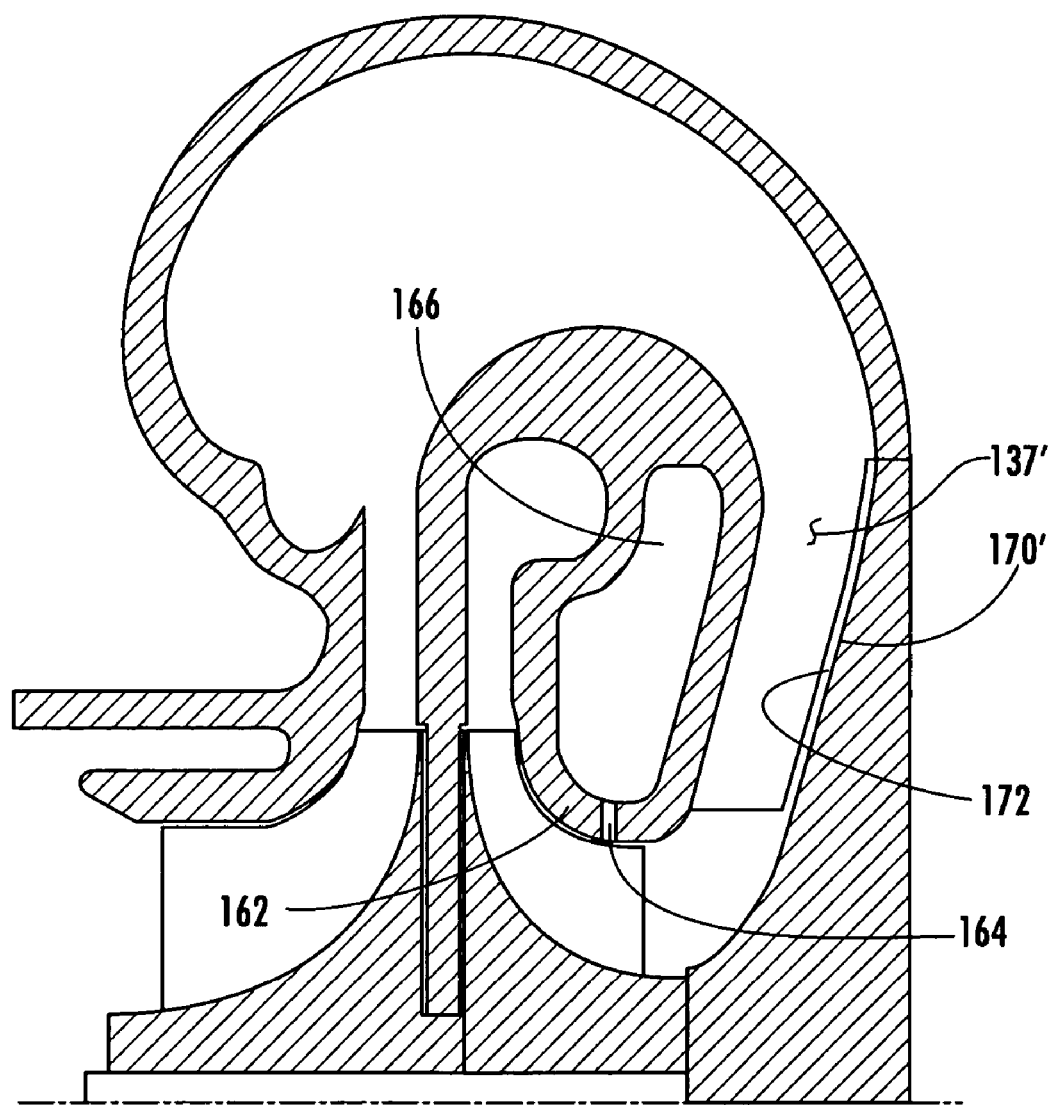
FIG. 12 is a schematic cross-sectional view of a two-stage compressor in accordance with a sixth embodiment of the invention.
Figure 13:
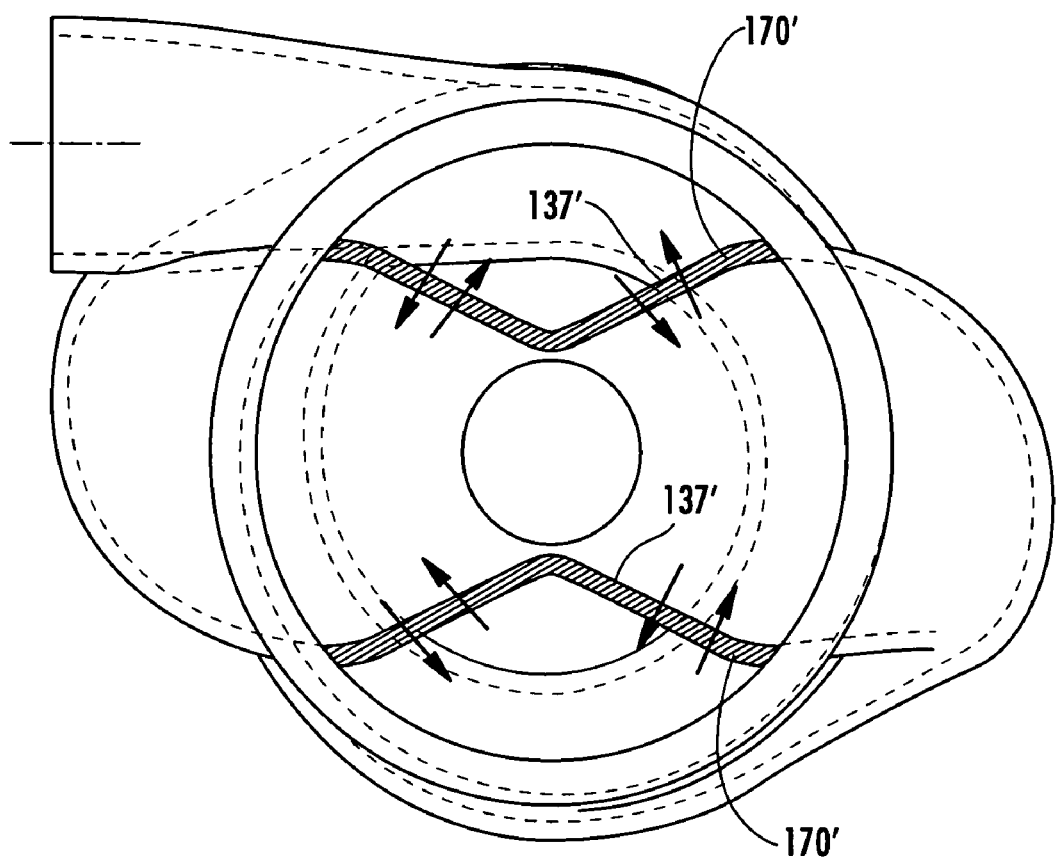
FIG. 13 is a view into the compressor housing of FIG. 12, as viewed toward the left in FIG. 12.

Another embodiment of the invention is depicted in FIGS. 12 and 13. This embodiment is generally similar to the previously described one, except that the walls 137' define "cutouts" 170' that extend the full lengths of the walls 137'—i.e., there is a gap 170' all along the lengths of the walls 137' between those walls and the adjacent wall 172 of the compressor housing.

In the various embodiments described above, during some operating conditions at relatively high pressure-ratios where surge is typically related to inducer stall, a portion of the fluid entering the inducer region of the second-stage impeller flows through the shroud ports 64, 164 into the flow passage 66, 166 and then through the openings and/or gaps and/or cutouts 68, 70, 168, 170, 170' back into the second-stage inlet flow path. It is believed that at near-surge conditions the ported shroud prevents or reduces the local flow recirculation in the inducer tip region that normally attends inducer stall and surge.

It is also possible to design the ported shroud in such a manner that the flow at a choke condition is increased relative to that obtained with a non-ported shroud. More particularly, additional flow passes through the openings and/or gaps and/or cutouts 68, 70, 168, 170, 170' into the flow passage 66, 166 and through the shroud ports 64, 164 into the second-stage impeller.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A turbocharger, comprising:
   a turbine mounted on a rotatable shaft for rotation about an axis of the shaft;
   a two-stage radial compressor comprising a compressor wheel mounted on the shaft and disposed within a compressor housing, the compressor wheel comprising a first-stage impeller and a second-stage impeller each having a hub and a plurality of compressor blades extending from the hub, the compressor housing defining an interstage duct that receives pressurized fluid from the first-stage impeller and conducts the fluid to an inlet flow path that leads into an inlet of the second-stage impeller, the compressor housing having a second-stage shroud disposed proximate tips of the blades of the second-stage impeller and having a second-stage volute arranged to receive pressurized fluid from an outlet of the second-stage impeller, the compressor further comprising a vane assembly in the inlet flow path of the second-stage impeller, the vane assembly comprising a wall and a plurality of circumferentially spaced vanes affixed to the wall;

wherein the second-stage shroud defines at least one port therethrough and the compressor housing defines a flow passage leading from said at least one port into the inlet flow path at a position upstream of said at least one port such that fluid can pass in either direction between the inlet flow path and the second-stage impeller via said at least one port and said flow passage, and wherein the wall of the vane assembly defines at least one opening connected with said flow passage that leads from said at least one port into the inlet flow path such that the inlet flow path is in fluid communication with said flow passage via said at least one opening.

2. The turbocharger of claim 1, wherein the first-stage and second-stage impellers each has a front side and a back, and the impellers are arranged with the back of the first-stage impeller facing the back of the second-stage impeller.

3. The turbocharger of claim 2, wherein the second-stage volute is disposed generally concentrically within the interstage duct.

4. The turbocharger of claim 3, wherein the housing further includes a discharge duct that passes from the second-stage volute through the interstage duct such that the fluid flowing in the interstage duct must flow around the discharge duct before reaching the second-stage impeller.

5. The turbocharger of claim 1, wherein the wall of the vane assembly defines a plurality of circumferentially spaced openings leading from said flow passage into the inlet flow path of the second-stage impeller.

6. The turbocharger of claim 1, wherein the second-stage shroud defines a plurality of circumferentially spaced ports connected with said flow passage.

7. The turbocharger of claim 1, the compressor housing defining an inlet flow path into the first-stage impeller and having a first-stage shroud disposed proximate tips of the blades of the first-stage impeller, wherein the first-stage shroud defines at least one port therethrough and the compressor housing defines a flow passage leading from said at least one port into the inlet flow path of the first-stage impeller at a position upstream of said at least one port such that fluid can pass in either direction between the inlet flow path and the first-stage impeller via said at least one port and said flow passage.

8. A turbocharger, comprising:

a turbine mounted on a rotatable shaft for rotation about an axis of the shaft;

a two-stage radial compressor comprising a compressor wheel mounted on the shaft and disposed within a compressor housing, the compressor wheel comprising a first-stage impeller and a second-stage impeller each having a hub and a plurality of compressor blades extending from the hub, wherein the first-stage and second-stage impellers each has a front side and a back, and the impellers are arranged with the back of the first-stage impeller facing the back of the second-stage impeller, the compressor housing defining an interstage duct that receives pressurized fluid from the first-stage impeller and conducts the fluid to an inlet flow path that leads into an inlet of the second-stage impeller, the compressor housing having a second-stage shroud disposed proximate tips of the blades of the second-stage impeller and having a second-stage volute arranged to receive pressurized fluid from an outlet of the second-stage impeller;

the compressor housing defining a first-stage volute that receives fluid from the first-stage impeller, the first-stage and second-stage volutes each extending circumferentially at least partially about the first-stage and second-stage impellers, respectively, and wherein the interstage duct comprises first and second conduits connected at circumferentially spaced positions to the first-stage volute, the first and second conduits passing radially outward of the second-stage volute and then extending radially inwardly and connecting at circumferentially spaced positions to the inlet flow path of the second-stage impeller;

wherein the second-stage shroud defines at least one port therethrough and the compressor housing defines a flow passage leading from said at least one port into the inlet flow path at a position upstream of said at least one port such that fluid can pass in either direction between the inlet flow path and the second-stage impeller via said at least one port and said flow passage, wherein each of the first and second conduits includes a wall that extends generally radially inwardly and joins with the second-stage shroud and that faces generally axially away from the second-stage volute, and wherein said wall of each first and second conduit defines at least one opening extending therethrough into the inlet flow path of the second-stage impeller and connecting with said flow passage that leads from said at least one port.

9. A turbocharger, comprising:

a turbine mounted on a rotatable shaft for rotation about an axis of the shaft;

a two-stage radial compressor comprising a compressor wheel mounted on the shaft and disposed within a compressor housing, the compressor wheel comprising a first-stage impeller and a second-stage impeller each having a hub and a plurality of compressor blades extending from the hub, wherein the first-stage and second-stage impellers each has a front side and a back, and the impellers are arranged with the back of the first-stage impeller facing the back of the second-stage impeller, the compressor housing defining an interstage duct that receives pressurized fluid from the first-stage impeller and conducts the fluid to an inlet flow path that leads into an inlet of the second-stage impeller, the compressor housing having a second-stage shroud disposed proximate tips of the blades of the second-stage impeller and having a second-stage volute arranged to receive pressurized fluid from an outlet of the second-stage impeller;

the compressor housing defining a first-stage volute that receives fluid from the first-stage impeller, the first-stage and second-stage volutes each extending circumferentially at least partially about the first-stage and second-stage impellers, respectively, and wherein the interstage duct comprises first and second conduits connected at circumferentially spaced positions to the first-stage volute, the first and second conduits passing radially outward of the second-stage volute and then extending radially inwardly and connecting at circumferentially spaced positions to the inlet flow path of the second-stage impeller;

wherein the second-stage shroud defines at least one port therethrough and the compressor housing defines a flow passage leading from said at least one port into the inlet flow path at a position upstream of said at least one port such that fluid can pass in either direction between the inlet flow path and the second-stage impeller via said at least one port and said flow passage, wherein each of the first and second conduits includes a wall that extends generally radially inwardly and joins with the second-stage shroud and that faces generally axially away from the second-stage volute and further includes a pair of circumferentially spaced walls joined to opposite edges of said wall that faces generally axially, said circumferentially spaced walls facing generally circumferentially toward each other, and wherein said flow passage that leads from said at least one port connects with the inlet flow path of the second-stage impeller through openings in said circumferentially spaced walls.

10. A turbocharger, comprising:

a turbine mounted on a rotatable shaft for rotation about an axis of the shaft;

a two-stage radial compressor comprising a compressor wheel mounted on the shaft and disposed within a compressor housing, the compressor wheel comprising a first-stage impeller and a second-stage impeller each having a hub and a plurality of compressor blades extending from the hub, wherein the first-stage and second-stage impellers each has a front side and a back, and the impellers are arranged with the back of the first-stage impeller facing the back of the second-stage impeller, the compressor housing defining an interstage duct that receives pressurized fluid from the first-stage impeller and conducts the fluid to an inlet flow path that leads into an inlet of the second-stage impeller, the compressor housing having a second-stage shroud disposed proximate tips of the blades of the second-stage impeller and having a second-stage volute arranged to receive pressurized fluid from an outlet of the second-stage impeller;

the compressor housing defining a first-stage volute that receives fluid from the first-stage impeller, the first-stage and second-stage volutes each extending circumferentially at least partially about the first-stage and second-stage impellers, respectively, and wherein the interstage duct comprises first and second conduits connected at circumferentially spaced positions to the first-stage volute, the first and second conduits passing radially outward of the second-stage volute and then extending radially inwardly and connecting at circumferentially spaced positions to the inlet flow path of the second-stage impeller;

wherein the second-stage shroud defines at least one port therethrough and the compressor housing defines a flow passage leading from said at least one port into the inlet flow path at a position upstream of said at least one port such that fluid can pass in either direction between the inlet flow path and the second-stage impeller via said at least one port and said flow passage, wherein each of the first and second conduits includes a wall that extends generally radially inwardly and joins with the second-stage shroud and that faces generally axially away from the second-stage volute and further includes a pair of circumferentially spaced walls joined to opposite edges of said wall that faces generally axially, said circumferentially spaced walls facing generally circumferentially toward each other, and wherein said flow passage that leads from said at least one port connects with the inlet flow path of the second-stage impeller through a gap between said circumferentially spaced walls and an adjacent wall of the compressor housing.

11. A two-stage radial compressor comprising:

a compressor wheel mounted on a shaft and disposed within a compressor housing, the compressor wheel comprising a first-stage impeller and a second-stage impeller each having a hub and a plurality of compressor blades extending from the hub, wherein the first-stage and second-stage impellers each has a front side and a back, and the impellers are arranged with the back of the first-stage impeller facing the back of the second-stage impeller, the compressor housing defining an interstage duct that receives pressurized fluid from the first-stage impeller and conducts the fluid to an inlet flow path that leads into an inlet of the second-stage impeller, the compressor housing having a second-stage shroud disposed proximate tips of the blades of the second-stage impeller and having a second-stage volute arranged to receive pressurized fluid from an outlet of the second-stage impeller;

the compressor housing defining a first-stage volute that receives fluid from the first-stage impeller, the first-stage and second-stage volutes each extending circumferentially at least partially about the first-stage and second-stage impellers, respectively, and wherein the interstage duct comprises first and second conduits connected at circumferentially spaced positions to the first-stage volute, the first and second conduits passing radially outward of the second-stage volute and then extending radially inwardly and connecting at circumferentially spaced positions to the inlet flow path of the second-stage impeller;

wherein the second-stage shroud defines at least one port therethrough and the compressor housing defines a flow passage leading from said at least one port into the inlet flow path at a position upstream of said at least one port such that fluid can pass in either direction between the inlet flow path and the second-stage impeller via said at least one port and said flow passage, wherein each of the first and second conduits includes a wall that extends generally radially inwardly and joins with the second-stage shroud and that faces generally axially away from the second-stage volute, and wherein said wall of each first and second conduit defines at least one opening extending therethrough into the inlet flow path of the second-stage impeller and connecting with said flow passage that leads from said at least one port.

* * * * *